Feb. 24, 1953 H. C. McKAY 2,629,757
METHOD OF CONSTRUCTION OF SENSITIVE THERMOPILES
Filed Nov. 8, 1943 4 Sheets-Sheet 1

Inventor
Herbert Couchman McKay
By [signature]
Attorney

Inventor
Herbert Couchman McKay
By Warren Dunham Foster
Attorney

Inventor
Herbert Couchman McKay
By [signature]
Attorney

METHOD OF CONSTRUCTION OF SENSITIVE THERMOPILES

Filed Nov. 8, 1943

Inventor
Herbert Couchman McKay
By [signature]
Attorney

Patented Feb. 24, 1953 2,629,757

UNITED STATES PATENT OFFICE 2,629,757

METHOD OF CONSTRUCTION OF SENSITIVE THERMOPILES

Herbert Couchman McKay, Eustis, Fla., assignor to Warren Dunham Foster, Eustis, Fla., and himself as trustees Application November 8, 1943, Serial No. 509,530

14 Claims. (Cl. 136—5)

A thermopile comprises a plurality of connected thermocouples and a thermocouple is a device which generates an electrical current when its temperature is raised. Although nonselective, a thermopile is particularly useful as a detector of infra-red radiation.

Two junctions are formed of wires or bands of electrically dissimilar metals, such for example as silver and bismuth, tin and bismuth, lead and zinc, copper and platinum, copper and nickel, copper and constantan, iron and constantan or copper and iron. If one group, known as "hot junctions," is subjected to heat while the other, known as "cold junctions," is maintained at the original temperature, an electrical current will be generated.

Thermopiles may be considered to fall into two chief groups—those relatively insensitive and those relatively sensitive. The first group includes rugged thermopiles for use as high temperature thermometers which have low sensitivity; relatively crude devices as generators for useful electrical currents; instruments based on the Peltier effect as for measuring radio frequencies; and telepyrometers for measurement as of heat radiated from a furnace and having moderate sensitivity coupled with ruggedness necessary for factory use.

The second or sensitive group includes two distinct types. A first type is a small instrument of moderately high sensitivity which is used for spectrometric measurement of the energy level of a specific wave length of visual as well as invisible radiation. A second type is an ultrasensitive thermopile for use in science. Ordinarily, such instruments are made in the laboratory in which they are to be employed, are highly delicate, and demand the highest skill in their use, but they are unfitted for general use.

One chief purpose of this invention is to provide an instrument of the sensitivity of the second group and even greater ruggedness and ease and cheapness of production than conventional instruments of the first group. Thermopiles made in accordance herewith are ultrasensitive but can withstand the wear and tear and even abuse which are given to commonly used scientific instruments. My thermocouples are at least as rugged as a photo-electric cell and may be even less expensive and troublesome to make.

Many practical difficulties have stood in the way of the wide use of ultra-sensitive thermopiles. Many metals are very difficult to draw in the form of wires as fine as are necessary and to solder. These wires, of a fineness of, say, for bismuth of four one-thousandths of an inch, must be united as completely as possible. Skilled artisans working under microscopes attempt to solder these junctions. Such attempts require the use of an amount of solder which is relatively very large in relation to the size of the wire. Differences in the co-efficients of expansion of the two metals often make such a joint unsatisfactory. If much solder is used, the effectiveness of the thermo-electric phenomena is much decreased and unbalance of electrical resistances is created. Also, such unions at best are not molecular but are the result merely of two wires of different metals being held together by a third metal, an unwanted amalgam, solder. Welding is equally or more difficult. Sputtering is also used to secure bands of dissimilar metals. Films of great thinness thus are secured, but it is difficult closely to control either the width and thickness of the sputtered metal or to maintain uniform density and to provide a close junction better than soldering. The varying and relatively uncertain cross sections of the sputtered metal are a handicap. An important purpose of this invention is to overcome the above difficulties.

Under previous practice known to me supersensitive thermopiles for the most part have been produced in relatively small quantities, as made necessary by the methods of their construction. In many instances, they are manufactured in situ. Such construction is entirely unadapted for production in quantity.

To avoid such and other difficulties in the manufacture of sensitive thermopiles, bolometers and photoelectric cells responsive to radiation in the infra-red band have been substituted. To operate either a bolometer or a photo-electric cell of a most common type a supply current must be fed into it to vary the current transmitted thereby. One great difficulty in this connection is that the normal variations of the input current cause greater variations in the output current than does the impact of infra-red radiation.

Photo-electric cells are susceptible of mass production, but have several important disadvantages when applied to purposes normally secured by a sensitive thermocouple, notably that a photo-electric cell responsive to infra-red radiation is a highly selective instrument which, if electronically efficient, is at the maximum responsive only to a narrow band. The type of photo-electric cell which is relatively sensitive to infra-red radiation is likewise a valve which requires an applied current and an efficient amplifier. Variations in input make such a cell relatively insensitive and unreliable. Also its selectivity is limited to infra-red radiation closely adjacent visible light and of little value with those wave lengths which characterize degrees of heat.

Previously existing thermopiles theoretically can be used in place of photo-electric cells for such purposes; but such use in the past has been a practical impossibility, owing to the cost, size, delicacy and complication of existing sensitive instruments. A chief purpose of this invention is to supply thermopiles which may be employed wherever a photo-electric cell is practical for the uses indicated above and in many cases where such a cell is not practical.

One important purpose of this invention is to make available for general use a sensitive thermopile which can be manufactured at least as easily and cheaply as a photo-electric cell and will have at least the ruggedness of such an instrument, yet will be non-selective, until a chosen filter is applied if selection is wanted. It is to be noted that photo-electric cells commonly employed in place of thermopiles are valves, not generators. Thermopiles which are constructed in accordance with this invention have extreme sensitivity and do not suffer from the normal variation encountered even in a carefully controlled input to such a cell.

A sensitive thermopile produced in accordance with this invention has none of the defects of previous sensitive thermocouples known to me.

My invention makes use of the principles that to obtain a high degree of usable sensitivity in a thermocouple it is desirable to provide, first, a highly minute and uniform elongated and filamented mass of each metal (hereafter for convenience called a "film") so that its temperature can quickly be raised; second, an intimate junction between relatively very small areas of whatever dissimilar metals of which use is made; third, to maintain as high a temperature differential as is practicable between the hot and cold metallic junctions; and, fourth, to control the metallic mass to obtain the desirable balance of resistance in both metals. It is desirable and, for mass production necessary, to attain the above results by methods and means which can be carried out relatively simply and can be effectuated largely by mechanical means. A thermocouple made in accordance herewith exemplifies the above advantages and at the same time is highly sensitive. It is also rugged, not limited in response to a narrow range of frequencies, and inexpensive and simple to manufacture under modern manufacturing practice.

I may produce a sensitive thermocouple having the above described advantages by first protecting a base which may be, for example, a thin sheet of glass or plastic, with a resist which covers all thereof except minute diagonal parallel lines representing one of the metals which will form the finished thermopile. By "resist" I mean a substance, such as soluble varnish, any material which will receive the vaporized metal, and which when removed from the base will leave the base free from any deposit of the metal. Such resist, therefore, protects the surface thereunder from the application of the metallic or other substance which is about to be applied to the base. I then place this base in a vacuum chamber in which a first metal, for example only, silver, is vaporized and then condensed thereupon. Thereupon I clean therefrom the resist first applied, which of course is now covered by the deposited silver, and have a base with minute parallel lines of silver molecularly bonded thereto. I then protect all of this base including all thereof except those minute parallel oppositely diagonal portions upon which I wish to condense a dissimilar metal, for example only, bismuth, and the ends of the lines of silver to which the bismuth lines are to be joined. The result is a base with parallel unprotected lines oppositely inclined to the inclined lines of deposited silver, each impinging upon one end of the first line of metal which has been deposited—in this example silver—and upon the opposite end of the next line in sequence. I thereupon again place the base within the vacuum chamber and vaporize and thereafter condense the other metal, for example bismuth. In the case of bismuth, by controlling the degree of vacuum I can deposit the metal in "black" form, rendering unnecessary the subsequent blackening of the junctions. Or I can later vaporize a blackening agent such as a zinc alloy and blacken the completed device in a third vaporizing operation. Thereupon I remove the resist and have a base with a criss-cross pattern of alternating minute silver and bismuth lines joined at each intersection. As a result of this construction, the individual bands may be kept of almost microscopic size. Morever, the junctions and the union between each metal and its base are molecular. That is, molecules of the lower surface of the second metal are deposited within the spaces between the molecules of the upper surface of the first metal, and molecules of each metal between those of the glass or other base. Moreover, as the junction is not made at high temperature, there is no danger of loosening a junction by the differential contraction of cooling, nor is the purpose for which the instrument is primarily designed such that temperature changes sufficient to cause such loosening will be encountered. Thus the junction is and remains more intimate than in other constructions known to me. As will be readily understood, this method can be carried out quickly and cheaply. In large production, I prefer to apply the several resists by means of rollers and at one time to coat long strips which are later cut into small units.

In the practice of this invention, the several materials may be applied to the bases by hand operations, but I prefer to make use of engraving or printing rollers or cylindrical presses somewhat as in certain photographic operations and in the printing arts. In such instances, the thermopile units may be made in long strips and thereafter cut to size.

Any of the methods described above will produce the essential element of a thermopile which hereinafter for convenience I call a "thermopile unit." Such a unit may be mounted and employed in any conventional or desired way but I much prefer to mount each unit between two sheets of plastic, glass or other substance which is a poor conductor of heat, in such manner that the hot junctions protrude slightly beyond the supporting sheets which cover protect and insulate the remainder of the unit. The hot junctions are blackened as has been described or treated with lampblack as is conventional in this art so that impinging heat radiation is absorbed and not reflected. The cold junctions are protected by the plastic base and the temperature differential between cold and hot junctions maintained relatively great. The free ends of the thermopile may thereupon be connected with any instrument such, for one example only, as a meter type galvanometer and used in any desired way. The use of this instrument is entirely without the scope of this application. One great advantage of all forms of my invention is that by its practice electric characteristics, notably resistance, of one element of a thermocouple relatively to another or to an instrument in circuit therewith may be maintained as desired with no increase in difficulty or expense of manufacture or loss of sensitivity.

I also may prefer to mount such a unit within an evacuated tube like a radio tube. Also, I may prefer to mount my unit within one chamber in an evacuated tube another chamber of which is insulated from the first and contains the first unit of an amplifying system.

From the foregoing general statement of my invention it will be readily understood by those skilled in this art that among its chief objects is provision of novel methods whereby sensitive thermopiles of improved characteristics may be quickly, cheaply and efficiently produced. Another chief object is the provision of sensitive thermopiles of greatly improved characteristics including an intimate bond between two dissimilar metals at the junctions, an increased bond between the metals and the base, much greater ruggedness and simplicity, and greatly decreased cost. Another object is the provision of an improved mounting for a thermopile. Still other objects include the provision of a thermopile and a portion of the electronic system of an amplifier intimately associated within the same envelope.

Other objects, advantages and characteristics will be clear from the following specification, the accompanying drawings and the subjoined claims. It will be readily understood by those skilled in the art that I am not limited by the specific examples which I show for purposes of illustration but that changes may be made in the specific structure without departing from the spirit of my invention or the scope of my broader claims.

Figures 11, 12:
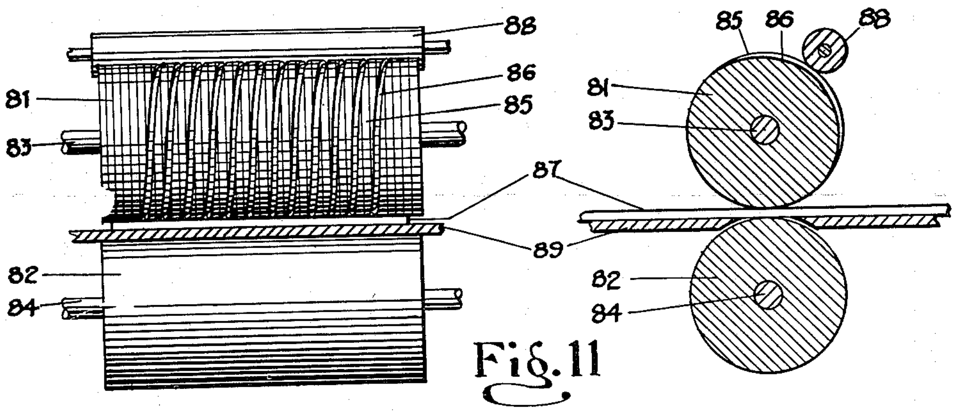

Figure 11 (Sheet 3), which is an elevation partly in section, shows a mechanical device for imprinting a resist.

Figure 12 is a transverse section of the printing device of Figure 11.

Figure 13:
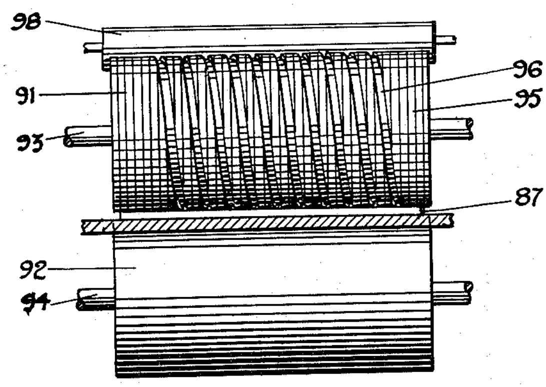

Figure 13 corresponds to Figure 11 but shows a roller for imprinting upon the base the resist precedent to the deposition of a second metal.

Figure 5:
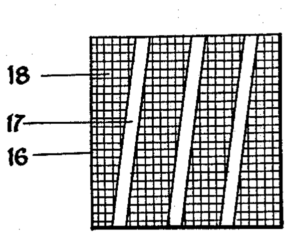
Figure 5 is a top plan view showing a base after the resist for a first metal has been applied.
Figure 7:
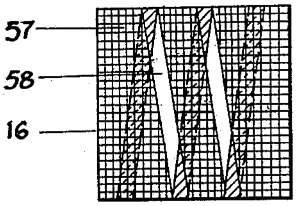
Figure 7 shows the base of Figures 5 and 6 after the resist for a second metal has been applied.
Figure 8:
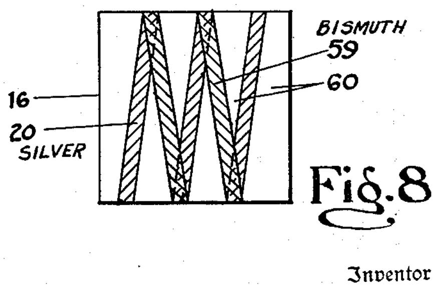
Figure 8 shows a completed base after both metals have been applied and the resist for the second metal also duly removed.
Figures 9, 10, 14:
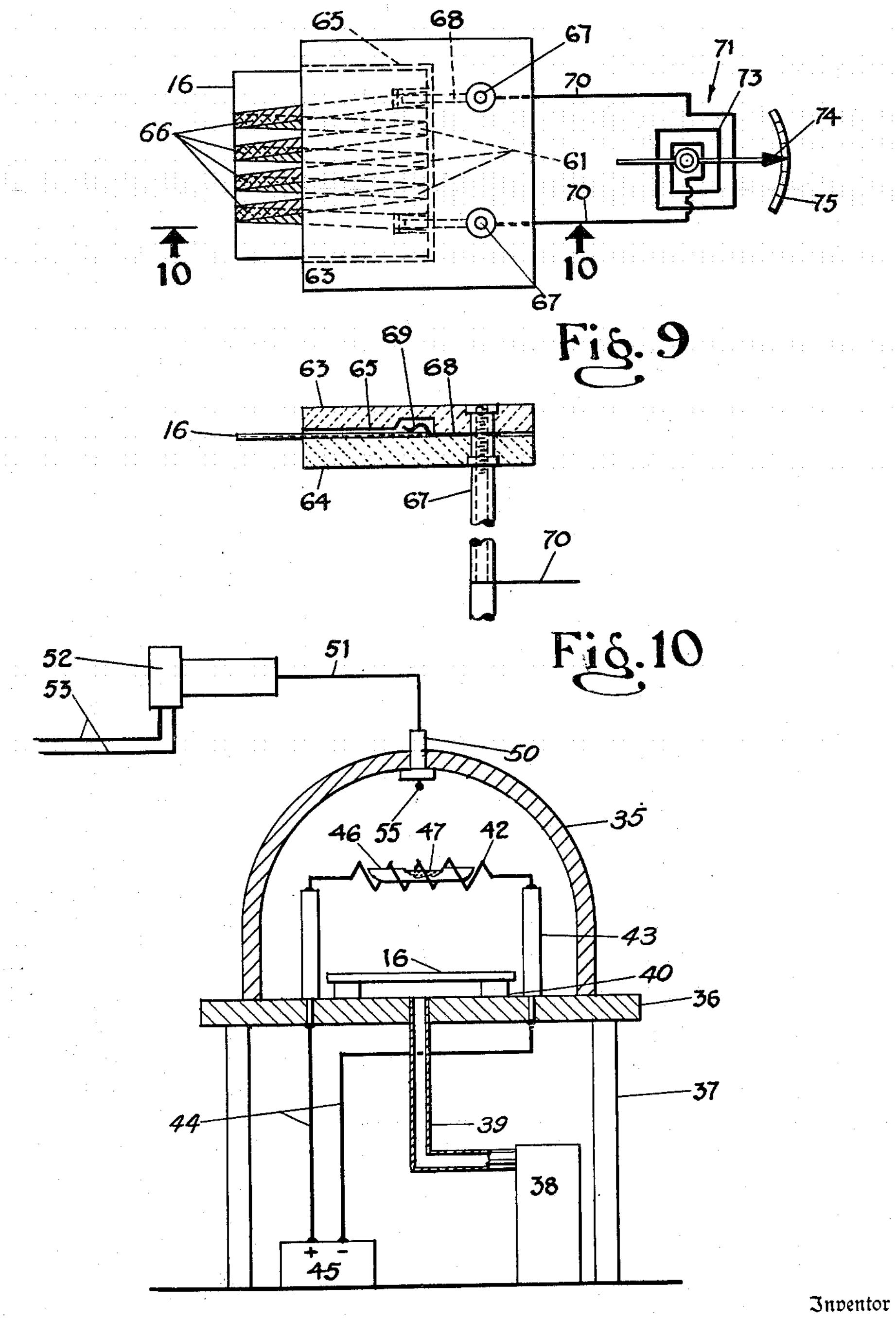
Figure 9 (Sheet 2) is a top plan view which shows one type of my completed thermopile.
Figure 10 is a partial section on the line 10—10 of Figure 9 looking in the direction of the arrows.

Figure 14 (Sheet 4) shows largely in section an apparatus by means of which two dissimilar metals may be condensed upon bases prepared as indicated above, the condensation of a first metal upon a base such as that of Figure 5 resulting in a semi-finished base such as that of Figure 6, a resist again being applied thereto to produce a pattern such as that of Figure 7 upon which a second metal is condensed to produce a finished base such as that of Figure 8.

Figures 15, 16:
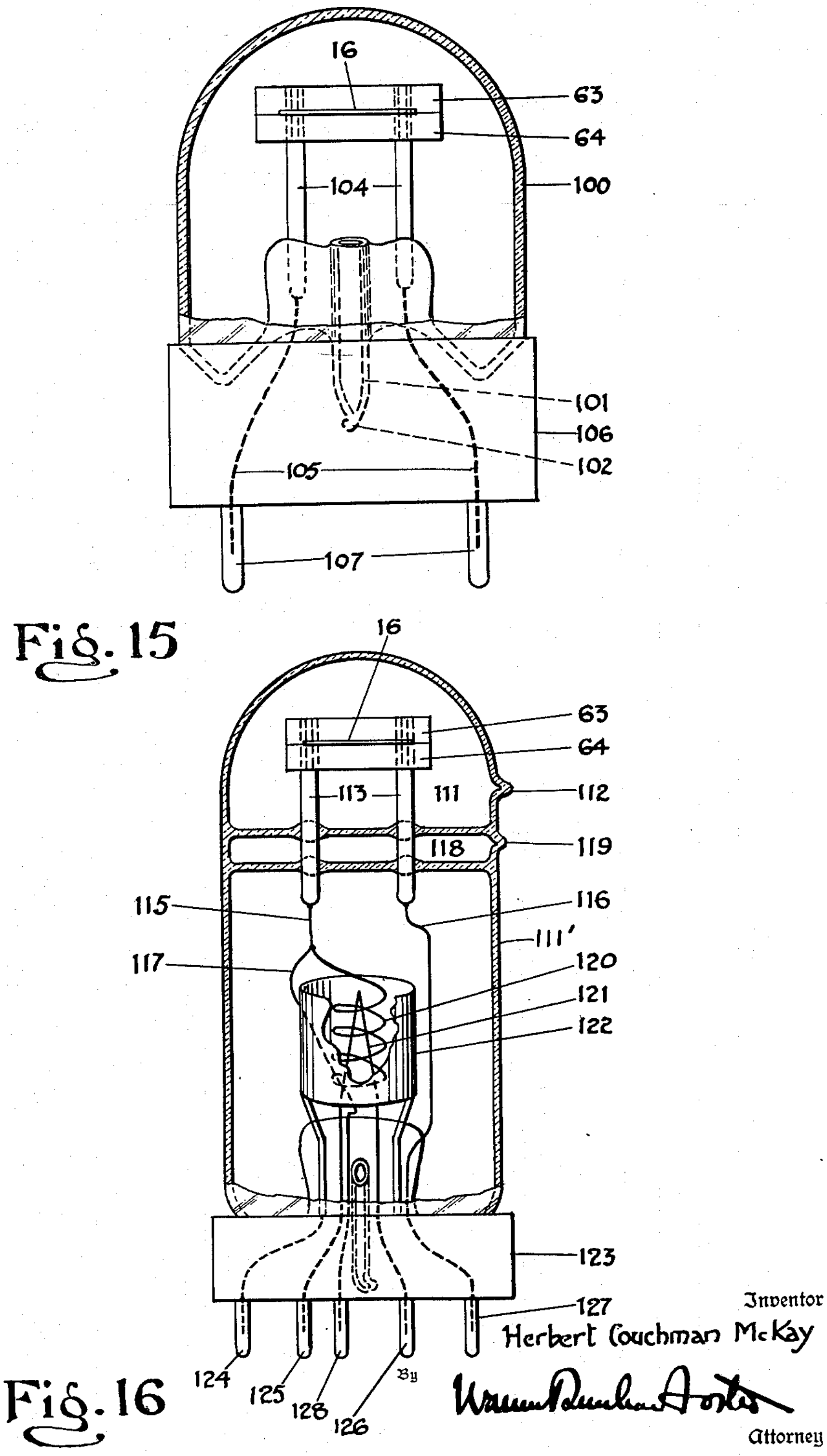

Figure 15 is a section of a completed thermopile mounted within an evacuated envelope.

Figure 16 is a section of a completed thermopile and an electronic tube insulated from each other and mounted within the same envelope, the electronic tube for purposes of illustration being shown as a first-stage emplifier.

Figure 17:
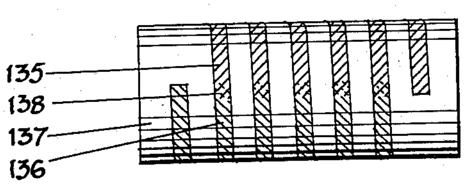

Figure 17 (Sheet 3) is an elevational view of a thermopile constructed upon a cylindrical base.

Figure 18:
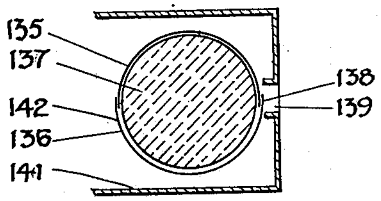

Figure 18 (Sheet 3) is a sectional view of the thermopile of Figure 17 mounted within a housing.

Figure 19:
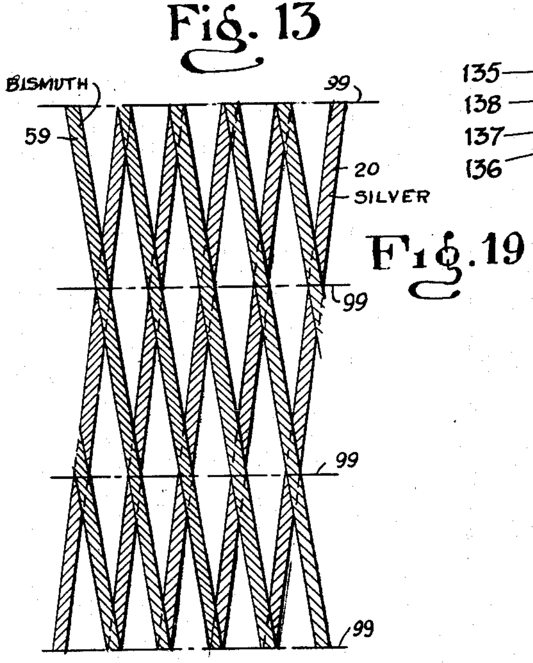

Figure 19 (Sheet 3) is an enlarged fragmentary view showing lines upon which a sheet is cut in order to produce junctions.

All the drawings are largely diagrammatic.

In the drawings above described, I illustrate a thermopile by showings in the form of the conventional V pattern. It will be fully understood by those skilled in this art, however, that this showing does not limit me to such a pattern. As a matter of fact, I may prefer to arrange the films of electrically dissimilar metals in any one of many other convenient patterns.

As pointed out in the preceding portion of this specification, the construction of a sensitive thermopile is based upon "hot junctions" and "cold junctions" of a narrow film or filament of dissimilar metals, as for example, silver and bismuth. In accordance with the practice of this art, I designate the respective junctions as "hot" and "cold." It will be understood that the operation of a thermopile depends upon the difference in temperature between the two sets of junctions. The difference between these temperatures, as is well understood, may be as little as 0.001 degree centigrade. In a relatively highly sensitive instrument, such as is produced by this invention, these junctions themselves as well as the films should be of relatively small area. According to a preferred form of this invention, I deposit such narrow films of these dissimilar metals upon a base, such as glass, preferably by condensing a metallic vapor to form a pattern. In order to form the necessary pattern, I previously apply to the base a resist. Resists include a soluble varnish such as collodion, gelatine or the like. They should cover all portions of the base which during that particular operation are to be kept free of the vaporized metal. Satisfactory resists also are made with collodion with alcohol and ether, gelatine or glycerine with warm water, and shellac with alcohol. Spar varnish, gold size and asphaltum are also satisfactory. After the deposition of a first selected metal, the resist, together with the metal which is deposited thereupon, is removed by solution and washing and a resist is again applied to cover all portions of the base, including all thereof upon which the first metal has been deposited except the terminal portions of each film which are to form the junctions with a second selected metal, upon which the second metal is not to appear in the finished thermopile.

Figure 1:
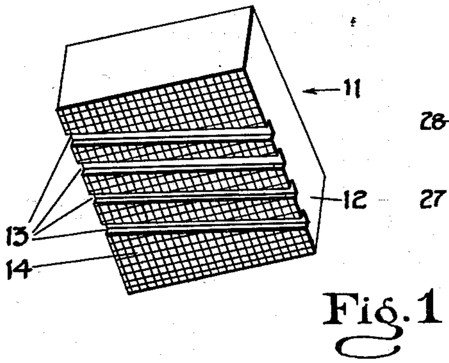
Figure 1 is an isometric showing of a stamp by which a resist may be applied precedent to the application of a first metal to a base for my thermopile.
Figure 2:
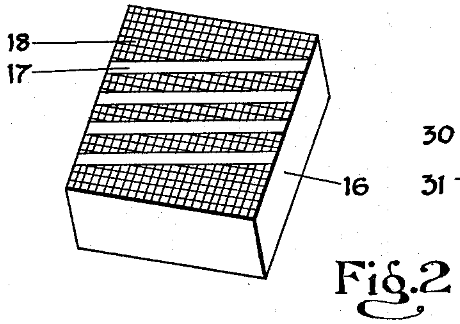
Figure 2 is an isometric showing of a base to which a resist for a first metal has been applied as by a stamp of the type of Figure 1.

A simple stamp 11 for applying a resist is shown in Figure 1. In a block 12, which may be of rubber, wood, metal or any other satisfactory material, grooves 13 are cut. This operation leaves between the grooves and between them and the outer edges of the block raised portions 14. The result is in effect a stamp or type suitable for printing. A resist is then placed upon the raised surface 14 and the stamp is impressed upon a chemically clean sheet of glass or other base 16, as shown in Figure 2. After the stamp has been removed from the base, the result of the impression, likewise as shown in Figures 2 and 5, is a pattern with clear portions 17 which are separated by protected portions 18. From the foregoing portion of this specification, it should be understood that when such a base is placed within an appropriate evacuated chamber and metal vaporized and condensed thereupon, the entire surface will be covered with that metal but within areas 18 the base itself will be protected by the resist; and, as the resist and metal deposited thereupon are removed, a pattern such as that shown by Figure 6 will appear in which bands or striations 20 of the metal are separated by clear portions 21. This base and the sheet from which it is cut must be electrically non-conducting and such terms when used in the subjoined claims should be so understood.

Figure 3:
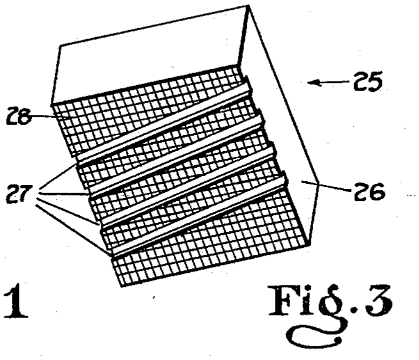
Figure 3 is an isometric showing of a stamp for the application of a resist precedent to the deposition of a second metal.
Figure 4:
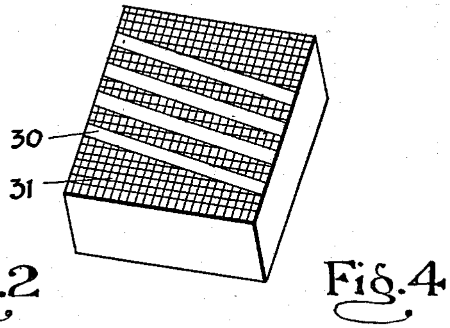
Figure 4 is an isometric showing of a base to which a resist for a second metal has been applied as by a stamp of Figure 3.

In order to deposit a second and dissimilar metal in the desired pattern, it is necessary to complete the V-shaped pattern by an additional application of a resist. A convenient instrumentality for this purpose is a stamp or type 25 formed as shown in Figure 3. This device also consists of a block 26 into which grooves 27 have been cut, leaving raised portions 28. The impression of such a block after a resist has been applied to the raised portions 28 is shown in Figure 4. The clear pattern 30 separated by protected portions 31 is similar to that of Figures 2 and 5 but the elements of the pattern are those of the other legs of the ultimate V pattern shown by Figure 7.

As stated hereinbefore, the drawings are very largely diagrammatic. For example, in the drawings described above and below for simplicity I have shown only four films of each metal, although as a matter of fact I prefer many more.

After the first resist has been applied as shown in Figure 5 and of course before the second resist is applied, it is necessary to vaporize and condense a chosen metal upon the base 16.. This process will be described and then reference will be made to other more highly developed mechanical means for preparing the base prior to this deposition of the metal.

As shown in Figure 14, a base 16 prepared as shown in Figure 5 is placed within a vessel or bell 35. This vessel may be mounted upon a base or table 36 supported as by struts or a housing 37. To evacuate this vessel, a conventional motor-driven air pump 38 is connnected thereto by a tube 39. Within the vessel, supports 40 are arranged, upon which bases 16 may successively rest. Vaporization of a selected metal is accomplished by means of a coil 42 supported by struts 43 placed acentrically within the interior of the vessel. This coil is fed by leads 44 from source of electrical energy 45, generally of low voltage. A vessel 46 of the type known in this art as a "boat" containing a metal 47, such for example as silver or bismuth, is disposed within the coil and surrounded thereby. Energization of the coil to the point of incandescence will, of course, volatilize the metal in a manner which is conventional in the art of metallic vapor deposition. The vaporized metal diffuses throughout the interior of the bell. Thereupon the current is cut off. It is thereafter necessary to carry out the process known in this art as "cleaning," the precipitation or condensation of the metal. It is preferable that within the chamber a high tension current be discharged by a device generally indicated as 50 which is connected by lead 51 to a high-tension coil 52 of the Tesla or Ouidin type which is fed from a usual transformer by a circuit 53. This high-tension current is discharged by a ball 55 within the chamber 35 and causes vaporized metal to be deposited within the chamber. It thereafter presents a highly polished surface.

The vacuum within the chamber should be relatively high, preferably of the order of a fraction of a micron, for example 0.0005 to 0.001 mm. mercury. During the evacuation and prior to the vaporization and deposition of the metal as described above, the preliminary discharge from the high-tension coil through the ball 55 by its specific appearance serves as a visual indication of the approximate degree of evacuation within the chamber.

Figure 6:
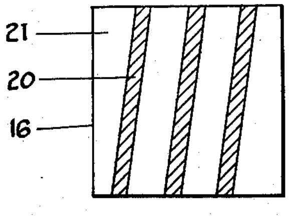
Figure 6 shows the base of Figure 5 after a first metal has been deposited and the resist removed.

After the first metal, say silver for example only, has been so deposited as a thin and narrow metallic film 20 upon a base 16, the resist is cleaned off, leaving the base in the form shown in Figure 6. Other portions of the base to receive the condensed metal must be chemically clean. Thereupon a resist is again applied as by the stamp of Figure 3 to cover all the base except those portions upon which a film of the opposite metal, say bismuth for purposes of example only, is to be deposited. This resist takes the form 57 shown in Figure 7. Striations 58 remain clear ready for the deposition of the bismuth or other metal. Thereupon the base 16 is again placed within chamber 35, bismuth substituted for silver in the boat 46, a vacuum created and the previous process of vaporizing and deposition is thereupon repeated with the result shown in Figure 8. At this point, there results a base 16 with alternate striations 20 and 59 of silver and bismuth, the remaining portions 60 of the base being clear. These V-shaped films form the hot and cold junctions respectively of the finished thermopile.

It is particularly to be noted that the junctions which are thus created are extremely intimate and, in fact, are the result of a molecular physical union between the glass or other base and the two metals. The thickness of each film is of the order of from two to three microns, say one ten-thousandth of an inch. In order to secure balanced electrical resistance, it is desirable, for example, to make use of approximately four times the volume of bismuth as of silver. According to this and all other forms of this invention, such differences can be accurately and easily secured. In practice I have found it advisable to make each film approximately one-quarter of a millimeter in width and to space them from one to two millimeters apart. Thus each film is of a width approximately 2500 times its thickness and is a true and very thin foil. As a result, very much increased sensitivity is secured. Although metallic films of relatively large surface area have previously been made of this extreme thinness, so far as I am aware such films which are both thin and narrow for the express purpose of providing an electrical conductor of as much surface exposure as possible with a minimum of mass are novel. If, however, less sensitivity is desired, each film may be made wider and thicker. It is to be understood, however, that these dimensions are given for purposes of illustration only and that I am in no way committing myself to films of any given thickness or width. I emphasize that according to my method it is easily possible to produce hot or cold junctions in which the bond is very much more intimate than any that has been previously achieved, so far as I am aware, and in which the thickness of the metal and the amount included within the junctions are also very much less than in the conventional sensitive thermocouple.

One of the great advantages of this embodiment of my invention is the exact quantitative control which can be obtained. Since the surface area of each film is held by the pattern of the resist within very close limits, the mass of each metal is determined solely by the amount thereof which is condensed upon the base. This condensation can be controlled within the very closest bounds, with the thickness of each metal held within a micron or less. As is well-known in this art, the resistance of the two metals must be carefully adjusted to each other. This adjustment is best carried out by differences in mass which are most easily and accurately secured by differences in thickness. For example, in the silver and bismuth combination, which is mentioned solely for purposes of illustration, it is desirable to provide approximately four times the mass of bismuth as of silver. This result is most easily obtained by depositing a bismuth layer which is four times as thick as that of silver. Alternatively, the film of one metal may be made of greater width than that of the other, but this method does not give me as close control and presents greater manufacturing difficulty.

I wish again to emphasize the fact that the specific metals which I mention herein are for purposes of illustration only and that I am in no way limited to those metals or combinations.

As is known to those skilled in the art, the hot junctions must be blackened in order to make them as absorptive as possible of impinging infra-red rays. A conventional method is to apply lamp-black or the like. Alternatively, a third condensing operation may be performed in which zinc or an alloy of zinc, preferably zinc-antimony, is placed within the boat 46 and the condensing operation carried out as previously described. The result is a molecularly bonded black absorptive coating covering the entire structure. I much prefer, however, to accomplish this result without the use of a separate step. To this end, I proceed as previously described except that in the deposition of a second metal I increase pressure within the bell jar to an amount sufficient to cause the blackening of the particular metal employed, for example as much as .25 mm. mercury, in the case of bismuth. The result is a deposit of the second metal and the blackening of the junctions in the one operation, thus eliminating a troublesome separate step.

A preferred mounting for my thermocouple unit is illustrated in Figures 9 and 10. The greater the difference in temperature between the cold junctions and the hot junctions, the greater the electrical flow which is induced therebetween. In order well to insulate cold junctions 61, I may mount the unit 16 between two plates of plastic 63 and 64 which are opaque to infra-red radiation. In one of these plates I cut an opening 65 which receives the base. The sides of these plates extend beyond three of the edges of the thermocouple and consequently give it rigidity. Alternatively, I may cast a single block of plastic with appropriate openings. A portion of the unit, however, sufficiently wide to accommodate the hot junctions 66, is permitted to extend outwardly from the mass of the plastic plates 63 and 64. These hot junctions are thus exposed to an incoming signal, while the cold junctions are well insulated therefrom. I may coat the exposed hot junctions with an absorptive material, such as lamp-black or platinum black, as is common with sensitive thermocouples. I prefer to apply such coatings in all forms of this invention. Or, I may blacken by the vaporization method previously described. I prefer to mount the entire cell and structure upon posts 67 to which ends of the filament are attached as by leads 68, terminating in a light contact spring 69.

The minute current which is created by the impact of infra-red radiation upon the hot junctions 66 may be utilized in any desired or appropriate fashion. In Figure 9, I show it connected by leads 70 to a conventional galvanometer indicated as 71 in which a coil 73 operates a pointer 74 with which is associated a scale 75.

I may prefer to use a sensitive relay of the meter type which closes a circuit to a power relay which operates whatever apparatus a user may desire to control. Alternatively, by leads 68 an input grid of an amplifier tube may be fed. Preferred mountings for this unit are shown in Figures 15 and 16 and another preferred form of unit in Figures 17 and 18, all later described. It is, of course, to be understood that the work to be performed by the current created by this thermopile does not fall within the ambit of this invention.

In the preceding portion of this specification, I have described a simple method, together with the means for carrying it out, of implanting a resist upon a base. Figures 11 and 12 illustrate other and preferred and more highly developed methods and means for implanting a resist upon a base.

Two rollers 81 and 82 respectively may be driven in any conventional or desired manner. Upper roller 81 may have cut upon it a pattern similar to that of stamp 11 of Figure 1, raised portions 85 appearing between grooves 86. Roller 82 is a plain cooperating pressure roller. The resist is applied by "inking" rollers 88 such as those usual in the printing art.

In this case, base material 87 is supplied in relatively long sheets or rolls which are later cut into individual units. The base may be of glass or of any desired plastic, such for example as cellulose acetate. It is fed forwardly upon bed 89. In this instance, after the unit has been so applied, relatively much longer lengths are placed within a vacuum chamber and a first metal deposited and the resist and surplus metal cleaned off. Thereupon to this sheet, which now corresponds to that shown in Figure 6, the resist is again applied by rollers 91 and 92 shown by Figure 13. Roller 91 has raised portions 95 which correspond to raised portions 85 of roller 81 and grooves 96 which correspond to grooves 86 but disposed in an opposite direction. Cooperating roller 92 is plain. These rollers revolve upon shafts 95 and 94 respectively. The resist is applied by a roller 98. The result of this operation is a strip of base material corresponding to that shown by Figure 7. After a second metal has been deposited thereupon, the results are similar to those shown by Figure 8. Thereupon the sheets are cut through the hot junctions and cold junctions, with additional longitudinal cuts if desired, to form individual thermopile bases or units. From the previous portion of this description and consideration of such figures as 8 and 9 hereof it will be evident that these junctions have appreciable area and as shown for purposes of illustration only take the form of a letter X. As is clearly shown in Figure 19 since they are cut, along the line indicated as 99, at the point at which two films making up the X cross, the severance of each X form leaves two dissimilar metals in intimate union in the form of two letters V. Thus by cutting my strip or base material straight across these original junctions I form two junctions which are completely operative.

As previously stated, each unit may be mounted in any desired manner. One preferred form is shown by Figures 9 and 10. As is shown in Figure 15, I may mount such a unit 16, held between plastic plates 63 and 64 as shown in Figure 10, within an envelope 100 of a substance transparent to infra-red radiation which has been evacuated by a tube 101 sealed off at 102. Pillars 104 both support these plates (corresponding to pillars 67 of Figures 9 and 10) and serve as a conducting medium for the two wires 105 which pass through a base 106 and terminate in contact prongs 107. It is to be noted that the construction of such a tube with a thermopile is as simple and inexpensive as that of many types of radio tubes.

For purposes of convenience and greater efficiency in manufacture and use, it is often desirable to mount my thermopile unit in an evacuated vessel or envelope which likewise carries an electronic tube which may well be the first element of an amplifier circuit.

A cell unit 16 supported by mounting plates 63 and 64 may be positioned in a chamber 111 within an envelope 111' which has been exhausted through an opening sealed at 112. Mounting posts 113 support the thermopile and house the upper portion, as viewed in the drawings, of leads 115 and 116 which proceed from the thermopile. Lead 115 is biased at 117. These posts pass through an evacuated chamber 118 which has been exhausted and sealed as at 119. A third and lower chamber is in effect an electronic tube. It has a grid 120 which is activated by lead 115 from the thermopile, a filament 121 and a plate 122. Five leads pass through a base 123 into their respective base pins, 124 for the plate, 125 and 126 for the filament, 127 for lead 116 which is the ground potential negative, and 128 for the grid bias lead 117.

It will be recognized by those skilled in this art that the above construction represents a convenient, novel and efficient electronic device which combines within one envelope two cooperating electronic devices. This construction minimizes loss and gives a short grid lead as required by devices activated by minute currents. Although such an arrangement embodying the first element of an amplifier current is particularly useful, I may combine other elements within the same envelope which houses my thermopile. In such instance a short extension of an output lead feeds a grid of the cooperating electronic device. In the past a plurality of elements have been positioned within the same envelope; but, so far as known to me, it is novel to position within one outside enclosure a plurality of elements which require different conditions of ambient temperature and separate elements requiring one condition from those requiring another by an evacuated double partition. The utility of such an arrangement is great. The sensitive circuit is protected from external electrical disturbances, such for example as capacitative changes; trouble from corroding and loosening connections is eliminated. In addition the stable or cold junctions must be protected from the heat generated by the thermionic elements of the tube. A single glass wall is not sufficient, but a double wall enclosing a vacuum is very effective.

According to the above construction, since there is no need for any circuit building between the two significant parts, the cell can be permanently welded into position, thus providing current continuity and rigid support for the cell and making possible the pre-positioning of the cell so that interchange of one cell for another within sensitive apparatus may be effected without the necessity for prolonged and delicate positioning. Such pre-positioning applies also to the other arrangements which I am illustrating herein.

In place of forms of mounting previously shown and described, that illustrated in Figures 17 and 18 may be employed. Bands 135 and 136 of dissimilar metals may be condensed upon a cylindrical support 137.

Hot junctions 138 found in such a cylinder are disposed before an opening 139 in a casing 141, while the cold junctions 142 are disposed upon the opposite sides of the cylinder.

The advantages of my invention will be made apparent from the foregoing portion of this specification, the attached drawings and the subjoined claims. They include improved sensitive thermopiles which respond to the impact of minute stimuli and are more rugged than any sensitive thermopiles previously known to me, and simple and cheap to manufacture in accordance with modern production technique. The advantages include also novel methods whereby a sensitive thermopile of great efficiency can be manufactured easily, simply and cheaply. Also among these advantages are a thermopile and methods of manufacture thereof wherein quickly and easily a molecular bond is established both at each junction and also between the dissimilar metals which are employed and their base. Other advantages lie in improved mountings of thermopile units and a novel and effective combination of thermopiles and other electronic devices.

I claim:

1. A method of producing a thermopile which comprises stamping a resist upon all of an electrically non-conducting base except those portions upon which narrow films of a first metal are to appear, condensing upon said base so stamped a vapor of said first metal, cleaning the resist and the first metal deposited thereupon from the base thereby leaving narrow films of the first metal joined to the base, stamping a resist upon all of said base so treated except those portions upon which narrow films of a second metal are to appear, said films of said first metal crossing spaces not covered by said resist, depositing upon said sheet a vapor of said other and second metal, and cleaning from said base said second mentioned resist and said second metal deposited thereupon thereby leaving upon said base a desired pattern of both the said metals, said pattern thereby including a plurality of junctions of dissimilar metals.

2. A method of producing a thermopile which comprises stamping a resist upon all of one side of a base except that portion upon which a series of relatively closely spaced narrow films of a first metal are to appear, condensing upon the base so stamped a vapor of the first metal, cleaning the resist and the first metal deposited thereupon from the base, thereby leaving narrow films of the first metal joined to the base, stamping a resist upon all of said side of the base except those portions upon which spaced narrow films of a second and electrically dissimilar metal are to appear, such portions not so stamped in said operation extending between opposite ends of adjacent narrow films of the first metal, depositing upon said side of the base a vapor of the second metal, and cleaning from the base the resist and the second metal deposited thereupon, thereby leaving upon said side of the base a desired pattern of the first and second metals with two series of junctions of dissimilar metals spaced from each other.

3. A method of producing thermopiles which comprises applying a resist to a raised surface which represents all of a pattern for a base for a thermopile except that upon which narrow films of a first metal are to appear, transferring said resist from said surface to a base, condensing upon said base so coated a vapor of said first metal, cleaning the resist and the first metal deposited thereupon from the base thereby leaving narrow films of the first metal joined to the base, applying a resist to another or second raised surface representing all of a pattern of the base except that portion upon which narrow films of a second metal are to appear, transferring said resist to said base, raised portions being so disposed that when applied to said base they form junctions, depositing upon said base a vapor of said second and dissimilar metal, and cleaning from said base said second mentioned resist and the second metal deposited thereupon thereby leaving upon said base a desired pattern of both of said metals, said pattern thereby including groups each composed of a plurality of junctions of films of said dissimilar metals.

4. A method of producing a thermopile which comprises forming upon one side of a sheet of electrically non-conducting material a plurality of relatively long and closely spaced and narrow films of a first metal, forming upon said side of said sheet a plurality of relatively long and closely spaced and narrow films of a second metal, said second films crossing said first films at a plurality of points, cutting said sheet across such points of junction in a direction substantially normal to the plane of said sheet thereby forming a plurality of relatively small bases each consisting of a portion of said sheet and a plurality of said junctions supported thereby, and mounting said bases upon a support.

5. A method of producing a thermopile which comprises printing a resist upon all of a base except that portion upon which narrow films of a first metal are to appear, condensing upon the base so printed a vapor of the first metal, cleaning the resist and the metal deposited thereupon from the base thereby leaving narrow films of said metal joined to the base, printing a resist upon all of the base except those portions upon which narrow films of a second and electrically dissimilar metal are to appear, said portions not so printed joining opposite ends of adjacent films of the first metal, depositing upon the base a vapor of the second metal, increasing the pressure of the vaporizing operation to a point which results in the blackening of the deposited metal as well as its deposition, and cleaning from said base said resist and the metal deposited thereupon, thereby leaving upon said base a desired pattern of the first and second metals in blackened form.

6. A method of producing a thermopile which comprises printing a resist upon all of one side of a base except that portion upon which a narrow film of a first metal is to appear, condensing upon the base so coated a vapor of the first metal, cleaning from the base the resist and the first metal deposited upon the base thereby leaving a narrow film of the first metal joined to the base, printing a resist upon all of the base including the metal already deposited except those portions upon which a narrow film of a second and electrically dissimilar metal is to appear, the portions left uncoated making diagonal junctions with the metal already deposited, depositing upon said side of the base a vapor of the second metal, and cleaning from the base the resist and the second metal deposited upon the resist thereby leaving upon the base a film of said first metal and a film of said second metal in the form of overlaid diagonal junctions of the first and second metals in a plane parallel to that of said side.

7. A method of producing a plurality of thermocouples which comprises stamping a resist upon an electrically non-conducing sheet in a pattern which represents the portions of each of the bases of each thermocouple upon which no metal is to appear, condensing upon said sheet so coated a vapor of said first metal, cleaning the resist and the first metal deposited thereupon from the base thereby leaving narrow films of the first metal joined to the base, stamping a resist upon said sheet in a pattern which represents the portion of each of said bases except those upon which narrow films of the second metal are to appear, the open spaces left with no resist crossing said films of said first metal, depositing upon said sheet a vapor of said other and second metal, cleaning from said sheet said second mentioned resist and said second metal deposited thereupon thereby leaving upon said sheet a series of desired patterns of both the said metals, said patterns thereby including groups each composed of a plurality of junctions of dissimilar metals, and separating said sheets into a plurality of thermocouples by severing them across said junctions.

8. A method of producing thermopiles which comprises applying a resist to a first raised surface representing all of a pattern of a series of bases for a plurality of thermopiles upon which narrow films of a first metal are not to appear, depressed portions of said first surface representing the remainder of the pattern for each of said bases upon which a narrow film of a first metal only is to appear, applying said surface to a sheet of electrically non-conducting material to transfer said resist thereto, repeating said steps upon adjacent parts of said sheet, condensing upon said sheets so coated a vapor of said first metal, cleaning the resist and the first metal deposited thereupon from the sheet thereby leaving narrow films of the first metal joined to the sheet, applying a resist to another or second raised surface representing all of a pattern of several bases except that portion upon which narrow films of a second metal are to appear and a depressed portion which represents the portions of said pattern upon which narrow films of said second metal are to appear, said depressed portions being so disposed that when said surface is applied to said sheet they form junctions with the films of metal already applied, pressing said second surface upon said sheet to transfer said resist to a part of said sheet, repeating said last previously mentioned step upon adjacent parts of said sheet, said uncoated portions of said sheet being continuous, depositing upon said sheet a vapor of said other or second metal, cleaning from said sheet said second mentioned resists and said second metal deposited thereupon thereby leaving upon said sheet a series of desired patterns of both of said metals, said patterns thereby including groups each composed of a plurality of junctions of said dissimilar metals, and separating said sheets into a plurality of bases each of which contains a plurality of junctions of said first and second metals.

9. A method of producing a thermopile which comprises coating with a resist all of an electrical non-conducting base except that portion upon which narrow films of a first metal are to appear, condensing upon said base so coated a vapor of the first metal, cleaning the resist and the first metal deposited thereupon from the base thereby leaving narrow films of the first metal joined to the base, coating with a resist all of said base so coated except those portions upon which narrow films of a second and electrically dissimilar metal are to appear, said portions not so coated in both of said operations forming a pattern in which all but two of the ends of uncoated narrow films or bands are joined, depositing upon said base so coated a vapor of said other and dissimilar metal, cleaning from said base so coated said resist and the metal deposited thereupon thereby leaving upon said base a desired pattern of said metals, said pattern thereby including two groups each composed of a plurality of junctions of said dissimilar metals, and placing the unit so formed within material the thermal conductivity of which is low with one group of junctions formed by said metals extending therebeyond.

10. A method of producing a thermopile which comprises coating with a resist all of a relatively large electrically non-conducting sheet except that portion upon which a series of relatively closely spaced narrow films or bands of a first metal are to be deposited, depositing upon the sheet a vapor of the first metal, cleaning from the sheet the resist and the metal deposited thereupon thereby leaving upon said sheet a plurality of such relatively long closely spaced narrow films of the first metal, coating with a resist all of the sheet except those portions upon which spaced narrow films of a second and electrically dissimilar metal are to be deposited, said second uncoated portions crossing at a plurality of points each of the films of the first metal previously deposited, depositing the second metal thereupon, cleaning from the sheet the resist and the metal deposited thereupon thereby leaving upon said sheet two sets of narrow films of dissimilar metals crossing each other at a plurality of points, cutting said sheet across such points of junction in a direction subtantially normal to the plane of said sheet thereby forming a plurality of relatively small bases from portions of said sheet which carry points of junction, and mounting said bases upon a support.

11. A method of producing a thermopile which comprises coating with a resist all of one side of a base except that portion upon which a narrow film of a first metal is to appear, condensing upon said side of the base so coated a vapor of the first metal, cleaning from the base the resist and the first metal deposited thereupon thereby leaving a narrow film of the first metal joined to said side of the base, coating with the resist all of said side of the base except those portions upon which a narrow film of a second and electrically dissimilar metal is to appear, such portion not so coated in said operation being so disposed that it includes and overlays in a parallel plane thereto a portion of the first metal so deposited, depositing upon the base a vapor of a second metal, and cleaning from the base the resist and the second metal deposited upon the resist thereby leaving upon the base a narrow film of said first metal joined to a narrow film of said second metal.

12. A method of producing a thermopile which comprises coating with a resist all of a base except that portion upon which a series of relatively closely spaced narrow films of a first metal are to appear, said portion comprising a series of minute rectangular spaces the length of each of which is relatively very great in relation to the breadth, condensing upon the base so coated a vapor of a first metal, cleaning from the base the resist and the first metal deposited upon the resist thereby leaving narrow films with parallel sides of the first metal joined to the base, coating with a resist all of the base except those portions upon which spaced narrow films of a second and electrically dissimilar metal are to appear, such portions including junction portions already bearing films of the first metal, such portions being rectangular and of the same width as said previously mentioned portions for the reception of said first metal, condensing upon the base so coated a vapor of the second metal, timing such deposition so that the thickness of the film so deposited will vary in accordance with the differences of electrical characteristics between the two metals thereby creating films of the same width but compensating for differences in electrical characteristics by the thickness of metal deposited within a given width, and cleaning from the base the resist of the second metal deposited thereupon thereby leaving upon the base a desired pattern of the first and second metals.

13. A method of producing a thermopile which comprises coating with a resist all of a relatively large thin electrically non-conducting sheet except that portion upon which a series of relatively closely spaced narrow films or bands of a first metal are to be deposited, depositing upon the sheet a vapor of the first metal, cleaning from the sheet the resist and the metal deposited upon the resist thereby leaving upon said sheet a plurality of such relatively long closely spaced narrow films of the first metal, coating with a resist all of the sheet except those portions upon which spaced narrow films of a second and electrically dissimilar metal are to be deposited, said second uncoated portions crossing at a plurality of points each of the films of the first metal previously deposited, depositing the second metal thereupon, cleaning from the sheet the resist and the metal deposited upon the resist thereby leaving upon said sheet two sets of narrow films of dissimilar metals crossing each other at a plurality of points, cutting said sheet across such points of junction in a direction substantially normal to the plane of said sheet thereby forming from said sheet and said bands of metal a plurality of relatively small bases each of which includes two series of relatively adjacent junctions, one of said series being hot junctions and one of said series being cold junctions and said series being spaced from each other, and mounting such small bases between two parallel sheets of thin flat material with the cold junctions disposed therebetween and protected thereby and the hot junctions extending therebeyond.

14. A method of producing thermopiles which comprises applying a resist to a raised portion of a surface embodying a pattern for each of a series of bases for a plurality of thermopiles, said raised portion representing the portions of each of said bases upon which no metal is to appear, the depressed portions of said surface representing the remainder of the pattern for each of said bases upon which a narrow film of a first metal only is to appear, pressing said surface successively upon adjacent parts of a sheet of electrically non-conductive material thereby transferring said resist in said pattern to said sheet, condensing upon said sheet so coated a vapor of said first metal, cleaning the resist and the first metal deposited thereupon from the base thereby leaving narrow films of the first metal joined to the base, applying a resist to another or second raised surface, said second raised surface embodying all of a pattern of the several bases except that portion upon which narrow films of the second metal are to appear, the depressed portion representing the portions of said pattern upon which narrow films of said second metal are to appear, said depressed portions being so disposed that when said surface is applied to said sheet they form junctions or crossings of continuous films, pressing said surface with said resist thereupon upon adjacent parts of said sheet to transfer said resist thereto, said uncoated portions of said sheet being continuous, depositing upon said sheet a vapor of said other and second metal, cleaning from said sheet said second mentioned resist and said second metal deposited thereupon thereby leaving upon said sheet a series of desired patterns of both of said metals, said patterns thereby including groups each composed of a plurality of X-shaped junctions of said dissimilar metals, and separating said sheets into a plurality of bases by cutting said sheet across said junctions in a direction normal to the plane of said sheet at the point at which said continuous films cross to form V-shaped junctions from the X-shaped junctions previously formed, said bases thereby embodying a plurality of said junctions supported upon portions of said sheet.

HERBERT COUCHMAN McKAY.

REFERENCES CITED

The following references are of record in the file of this patent:

UNITED STATES PATENTS

| Number | Name | Date |
|---|---|---|
| 548,038 | Cox | Oct. 15, 1895 |
| 1,553,789 | Moeller | Sept. 15, 1925 |
| 1,570,444 | Mavrogenis | Jan. 19, 1926 |
| 1,615,983 | Jones | Feb. 1, 1927 |
| 1,618,743 | Adams | Feb. 22, 1927 |
| 1,618,744 | Adams | Feb. 22, 1927 |
| 1,626,931 | Grondabl | May 3, 1927 |
| 1,638,943 | Little | Aug. 16, 1927 |
| 1,652,148 | Olney | Dec. 6, 1927 |
| 1,667,142 | Darrah | Apr. 24, 1928 |
| 1,774,720 | Mieville | Sept. 2, 1930 |
| 1,809,475 | Dowler, Jr. | June 9, 1931 |
| 1,859,678 | Nachumsohn | May 24, 1932 |
| 1,916,408 | Bol | July 4, 1933 |
| 1,925,558 | Foster | Sept. 5, 1933 |
| 2,027,241 | Lowry | Jan. 7, 1936 |
| 2,106,768 | Southworth | Feb. 1, 1938 |
| 2,357,193 | Harrison | Aug. 29, 1944 |
| 2,369,767 | Abernathy | Feb. 20, 1945 |
| 2,381,819 | Graves, et al. | Aug. 7, 1945 |
| 2,416,775 | Sarver | Mar. 4, 1947 |

FOREIGN PATENTS

| Number | Country | Date |
|---|---|---|
| 403,000 | Germany | Sept. 19, 1924 |
| 417,099 | Germany | Aug. 3, 1925 |
| 527,433 | Great Britain | Oct. 9, 1940 |

OTHER REFERENCES

Harris et al., Rev. Sc. Insts., vol. 5 (1934), pp. 153–158.

Moriyama, I. M., Rev. Sc. Insts., vol. 10 (1939), page 164.

Beese, N. C. J. Opt. Soc. Am., vol. 31 (1941), page 708.